(12) United States Patent
Citta et al.

(10) Patent No.: US 6,700,930 B1
(45) Date of Patent: Mar. 2, 2004

(54) GHOST ELIMINATING EQUALIZER (75) Inventors: Richard W. Citta, Oak Park, IL (US); Scott M. LoPresto, Mt. Prospect, IL (US); Jingsong Xia, Mundelein, IL (US)

(73) Assignee: Zenith Electronics Corporation, Lincolnshire, IL (US)

( * ) Notice: Subject to any disclaimer, the term of this patent is extended or adjusted under 35 U.S.C. 154(b) by 0 days.

(21) Appl. No.: 09/283,877

(22) Filed: Apr. 1, 1999

(51) Int. Cl.[7] .............................. H04L 5/21
(52) U.S. Cl. ................... 375/229; 348/614
(58) Field of Search ................. 375/229, 230, 375/232; 348/14; 333/28 R (56) References Cited

U.S. PATENT DOCUMENTS

| | | | |
|---|---|---|---|
| 3,688,048 A | | 8/1972 | Clark ................ 179/15 BW |
| 5,119,196 A | * | 6/1992 | Ayanoglu et al. ......... 124/23.1 |
| 5,285,280 A | | 2/1994 | Teng et al. ............... 368/614 |
| 5,309,484 A | * | 5/1994 | McLane et al. ............ 375/354 |
| 5,317,595 A | | 5/1994 | Ostman ..................... 375/14 |
| 5,600,380 A | * | 2/1997 | Patel et al. ................ 348/614 |
| 5,615,208 A | | 3/1997 | Hagmanns ................. 370/252 |
| 6,021,421 A | | 2/2000 | Retter et al. .............. 708/422 |
| 6,289,045 B1 | * | 9/2001 | Hasegawa et al. ......... 375/231 |

FOREIGN PATENT DOCUMENTS

EP 0 600 739 6/1994

OTHER PUBLICATIONS

Hou, W. et al., "Complementary Filter Design for Testing of IS–95 Code Division Multiple Access Wireless Communication Systems", Instrumentation and Measurements, IEE Transactions, pp. 722–726 (1999).

Proakis, John G., "Digital Communications", McGraw–Hill, second edition, pp. 561–569.

International Search Report in International (PCT) Application No. PCT/US00/13620, dated Feb. 5, 2001.

* cited by examiner

Primary Examiner—Stephen Chin
Assistant Examiner—Kevin Kim (57) ABSTRACT

An equalizer substantially eliminates a ghost of a received main signal by (i) applying coefficients b (where b may be equal to one) to the received main signal and the ghost in order to modulate the received main signal and the ghost so that the received main signal and the ghost are unequal, (ii) applying coefficients a to the modulated received main signal and ghost in order to substantially eliminate the ghost, and (iii) applying coefficients c as a window function to the substantially ghost-free received main signal in order to remove the modulation imposed on the received main signal by the coefficients b.

66 Claims, 7 Drawing Sheets

GHOST ELIMINATING EQUALIZER

TECHNICAL FIELD OF THE INVENTION

The present invention is directed to an equalizer that substantially eliminates signal ghosts of up to and including 100% ghosts.

BACKGROUND OF THE INVENTION

Ghosts are produced in a receiver usually because a signal arrives at the receiver through different transmission paths. For example, in a system having a single transmitter, the multipath transmission of a signal may occur because of signal reflection. That is, the receiver receives a transmitted signal and one or more reflections of the transmitted signal. As another example, the multipath transmission of a signal may occur in a system having plural transmitters that transmit the same signal to a receiver using the same carrier frequency. A network which supports this type of transmission is typically referred to as a single frequency network.

Figure 1:
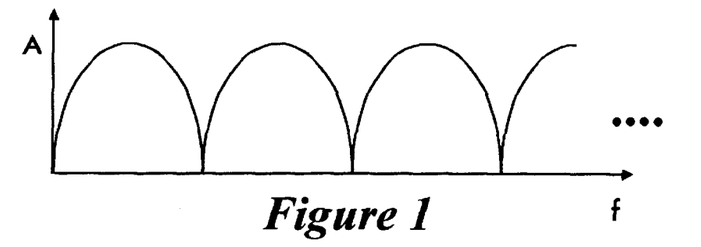
FIG. 1 shows an interference pattern which could result when two signals in the same frequency band are received by a receiver at substantially the same time.

When a signal reaches a receiver through two or more different transmission paths, an interference pattern results. In the frequency domain, this interference pattern is manifested by a variable signal amplitude along the frequency axis. An interference pattern which results when the ghost is 100% is shown in FIG. 1. This interference pattern has amplitude nulls or near amplitude nulls at certain frequencies. Therefore, any information contained in the received main signal in the neighborhood of these frequencies is likely lost because the signal to noise ratio near these frequencies is below a usable threshold.

A variety of systems have been devised to deal with the problems caused by ghosts. For example, spread spectrum systems deal very adequately with the problem of a 100% ghost by spreading the transmitted data over a substantial bandwidth. Accordingly, even though a 100% ghost means that some information may be lost in the neighborhood of frequencies corresponding to the amplitude nulls, a data element can still be recovered because of the high probability that it was spread over frequencies which do not correspond to the amplitude nulls. Unfortunately, the data rate R associated with spread spectrum systems is typically too low for many applications. (The data rate R is defined as the number of data bits per Hertz of channel bandwidth.)

It is also known to use a matched filter in a receiver in order to deal with the problem of a ghost. In this approach, data is transmitted as a data vector. The matched filter correlates the received data with reference vectors corresponding to the possible data vectors that can be transmitted. Correlation of the received main signal to the reference vector corresponding to the transmitted data vector produces a large peak, and correlation of the received main signal to the other possible reference vectors produces small peaks. Accordingly, the transmitted data vector can be easily determined in the receiver. Unfortunately, the data rate R typically associated with the use of matched filters is still too low for many applications.

Figure 2:
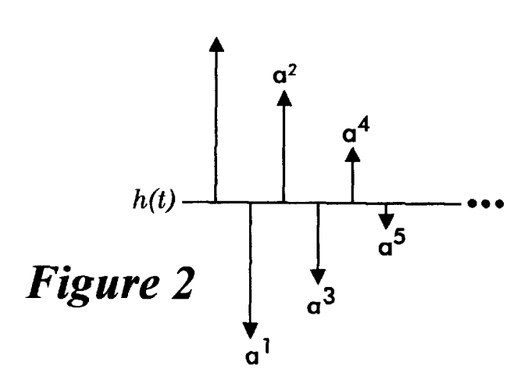
FIG. 2 illustrates the response of an FIR filter which is commonly used as a time domain equalizer in a receiver in order to eliminate ghosts.

When high data rates are required, equalizers are often used in a receiver in order to reduce ghosts of a main signal. A classic example of a time domain equalizer is an FIR filter. An FIR filter convolves its response h(t), shown generally in FIG. 2, with a received signal. The received signal contains the main signal and the ghost of the main signal. The FIR filter produces an output having a large peak representative of the main signal. Ghosts of the main signal have small components in the output of the FIR filter. However, as shown in FIG. 2, the values $a^1$, $a^2$, $a^3$, . . . of the taps of an FIR filter depend on the value of a and, in order to perfectly cancel a 100% ghost using an FIR filter, the value a of the FIR filter response must approach 1. As the value a approaches 1, the values of the taps of the FIR filter do not asymptotically decrease toward zero. Therefore, the FIR filter becomes infinitely long if a 100% ghost is to be eliminated, making the FIR filter impractical to eliminate a 100% ghost.

Figure 3:
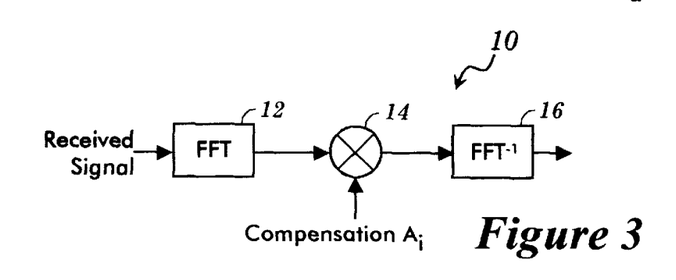
FIG. 3 illustrates a frequency domain equalizer which is used in a receiver in order to eliminate ghosts.

An example of a frequency domain equalizer 10 is shown in FIG. 3. The frequency domain equalizer 10 includes a Fast Fourier Transform (FFT) module 12 which performs a Fast Fourier Transform on the received signal in order to transform the received signal to the frequency domain. A multiplier 14 multiplies the frequency domain output of the FFT module 12 by a compensation vector which includes a row of coefficients $A_i$. An inverse FFT module 16 performs an inverse FFT on the multiplication results from the multiplier 14 in order to transform the multiplication results to the time domain.

Figure 4:
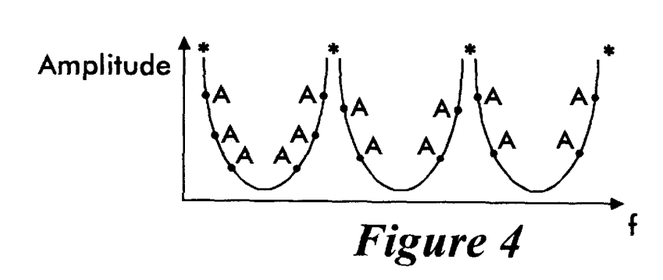
FIG. 4 illustrates an exemplary set of coefficients $A_i$ that are used by the frequency domain equalize of FIG. 3 in order to cancel ghosts.

FIG. 4 illustrates an exemplary set of coefficients $A_i$ which may be used by the frequency domain equalizer 10. The coefficients $A_i$ are chosen so that, when they and the FFT of the received signal are multiplied by the multiplier 14, the coefficients $A_i$ cancel the ghost in the received signal leaving only the main signal. It should be noted that the coefficients $A_i$ should have infinite amplitudes at the frequencies where the interference pattern has a zero amplitude. However, the coefficients $A_i$ cannot be made infinite as a practical matter. Accordingly, the coefficients $A_i$ are cut off at these frequencies, which means that information in the received main signal is lost at the cut off frequencies so that the output of the inverse FFT module 16 becomes only an approximation of the transmitted data.

Figure 5:
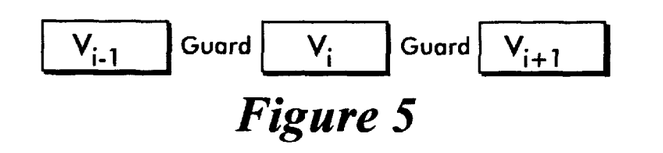
FIG. 5 illustrates guard intervals which may be used between transmitted vectors in systems employing equalizers.

Moreover, it is known to use empty guard intervals between the vectors employed in the frequency domain equalizer 10 of FIG. 3. The guard intervals are shown in FIG. 5 and are provided so that received vectors and ghosts of the received vectors do not overlap because such an overlap could otherwise cause intersymbol interference. Thus, the guard intervals should be at least as long as the expected ghosts. It is also known to use cyclic extensions of the vectors in order to give the received main signal an appearance of periodicity. Accordingly, a Fast Fourier Transform of the received signal and a Fourier Transform of the received signal appear identical.

Figure 6:
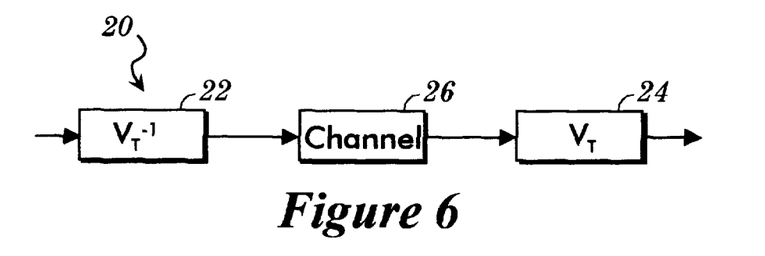
FIG. 6 illustrates an equalizer which includes a vector domain transform pair (i.e., a vector domain transform and an inverse vector domain transform)

The invention disclosed in U.S. application Ser. No. 09/158,730 filed Sep. 22, 1998 is directed to an equalizer which overcomes one or more of the above noted problems According to this invention, a vector domain equalizer 20 as shown in FIG. 6 relies on vectors to distribute the transmitted data in both time and frequency so that the vectors are essentially random in the time and frequency domains. Accordingly, in a heavily ghosted channel, all data can be recovered with small noise enhancement, and any enhanced noise that does exist is near white.

The vector domain equalizer 20 includes an inverse vector domain transform 22 and a vector domain transform 24 which are separated by a channel 26. Accordingly, the inverse vector domain transform 22 may be part of a transmitter, and the vector domain transform 24 may be part of a receiver. The inverse vector domain transform 22 performs a matrix multiplication between an input data block and a transform matrix. The input data block may include any number of data elements arranged in a row. These data elements may be bits, symbols, or any other suitable data entities. The transform matrix comprises a plurality of vectors arranged in columns, and each vector of the transform matrix preferably has a length commensurate with the number of data elements of the input data block. Also, the number of vectors of the transform matrix should preferably be commensurate with the number of data elements in the input data block. Accordingly, if there 256 data elements in the input data block, the transform matrix should preferably have 256 vectors each having 256 elements. The output of the inverse vector domain transform 22 is an output data block having a number of data elements commensurate with the number of data elements of the input data block. Thus, if there are 256 data elements in the input data block 32, the output data block has 256 data elements.

The vector domain transform 24 performs a matrix multiplication between the received main signal and a plurality of receiver vectors $V_R$. The data transmitted through the channel 26 is received, for example, as a row vector. During matrix multiplication, the vector domain transform 24 multiplies each component of the received row vector by a corresponding component in a first column of the receiver vectors $V_R$, and sums the multiplication results to produce a first component $r_1$ of a vector $r_i$ at the output of the vector domain transform 24. The vector domain transform 24 next multiplies each component of the received row vector by a corresponding component in a second column of the receiver vectors $V_R$, and sums the multiplication results to produce a second component $r_2$ of the output vector $r_i$, and so.

Assuming no channel distortion such as may be caused by channel interference, and assuming that the vector domain transform 24 uses the same vectors as are used by the inverse vector domain transform 22, the matrix multiplication performed by the vector domain transform 24 produces the original input data block. However, if channel distortion exists, the actual output data block produced by the vector domain transform 24 will not be equal to the original input data block. Accordingly, a training session is invoked where the vectors of the vector domain transform 24 are adjusted according to channel distortion such that, in the presence of channel distortion, the data of the original input data block is recovered.

The invention of U.S. application Ser. No. 09/158,730 works quite well. However, the present invention produces similar results but with fewer calculations.

SUMMARY OF THE INVENTION

In accordance with one aspect of the present invention, an equalizer for processing blocks of data comprises a finite filter and a post-processor. The finite filter has an output, and the finite filter is arranged to substantially eliminate a ghost from a received signal in order to provide a substantially ghost free signal at the output. The post-processor is arranged to apply a window function to the output of the finite filter. The window function has a duration substantially equal to a duration of a block of data.

In accordance with another aspect of the present invention, an equalizer comprises a pre-processor, a finite filter, and a post-processor. The pre-processor applies coefficients b to a received main signal and a ghost of the received main signal in order to modulate the received main signal and the ghost. The finite filter applies coefficients a to the modulated received main signal and ghost in order to substantially eliminate the ghost. The post-processor applies coefficients c as a window function to the received main signal in an output of the finite filter in order to remove the modulation imposed on the received main signal by the coefficients b.

In accordance with yet another aspect of the present invention, a method of substantially eliminating a ghost of a received main signal containing data blocks comprises the following steps: a) applying coefficients a to the received main signal and the ghost in order to substantially eliminate the ghost, thereby producing a substantially ghost-free signal, wherein the coefficients a have a duration longer than a duration of a data block; and, b) applying coefficients c to the substantially ghost-free signal, wherein the coefficients c form a window function having a duration substantially equal to the duration of a data block.

BRIEF DESCRIPTION OF THE DRAWINGS

These and other features and advantages of the present invention will become more apparent from a detailed consideration of the invention when taken in conjunction with the drawings in which.

DETAILED DESCRIPTION

Figure 7:
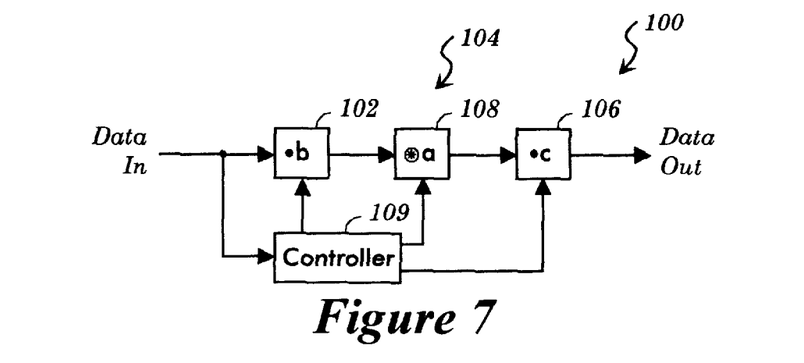
FIG. 7 illustrates a first embodiment of an equalizer in accordance with the present invention.

An equalizer 100 according to the present invention is shown in FIG. 7 and includes a pre-processor 102, a finite filter 104, and a post-processor 106. The pre-processor 102 of the equalizer 100 multiplies the signal received from the channel by coefficients b. The signal received from the channel is designated in FIG. 7 as Data In. The pre-processor 102 is a modulation operation that modulates the received main signal and its ghost so that the ghost is less that the received main signal. Accordingly, the ghost is no longer a 100% ghost.

The finite filter 104, as shown in FIG. 7, is a convolver 108. Accordingly, the multiplication results of the pre-processor 102 are convolved in the convolver 108 with coefficients a. The convolution performed by the convolver 108 eliminates the ghost from the multiplication results of the pre-processor 102.

The post-processor 106 multiplies the convolution results from the convolver 108 by coefficients c so that the output of the post-processor 106 is the data transmitted into the channel. The data at the output of the post-processor 106 is designated in FIG. 7 as Data Out. The post-processor 106 reverses the effects of the modulation imposed by the pre-processor 102 and applies a window function to the output of the convolver 108. This window function has a duration which is substantially equal to the duration of a Data In block.

Because the post-processor 106 applies a window function to the output of the convolver 108 so that a Data Out block temporally matches a corresponding Data In block, the convolver 108 may be implemented, for example, as an FIR filter, such as that described above in connection with FIG. 2. That is, because of the window function applied by the post-processor 106, the number of taps of an FIR filter need not be infinite but may be limited to a reasonable number. For example, these taps may have a duration that is twice the duration of a Data In block.

A controller 109 is provided to measure the time interval, d, separating the received main signal and its ghost. As discussed below, the interval d may be used in shaping the coefficients b, a, and c. The controller 109 supplies the coefficients b to the pre-processor 102, supplies the coefficients a to the convolver 108, and supplies the coefficients c to the post-processor 106. The controller 109 also synchronizes the pre-processor 102, the convolver 108, and the post-processor 106 to each block of data moving through the equalizer 100. Each two blocks of data may be separated by a guard interval.

Figure 8:
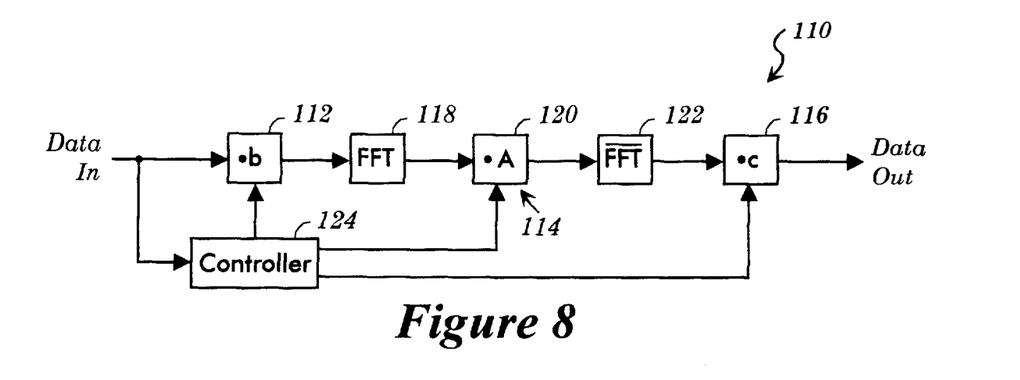
FIG. 8 illustrates a second embodiment of an equalizer in accordance with the present invention.

FIG. 8 illustrates an equalizer 110 which is equivalent to the equalizer 100 shown in FIG. 7 and which includes a pre-processor 112, a finite filter 114, and a post-processor 116. The finite filter 114 includes a Fast Fourier Transform 118, a multiplier 120, and an inverse Fast Fourier Transform 122. Thus, whereas the finite filter 104 operates in the time domain, the finite filter 114 operates substantially in the frequency domain where the multiplier 120 applies complex coefficients A (described below) to the frequency domain output of the Fast Fourier Transform 122.

Accordingly, the pre-processor 112 of the equalizer 110 multiplies the signal received from the channel by the coefficients b. Again, the pre-processor 112 is in effect a modulation operation that modulates the received main signal and its ghost so that the ghost is unequal to the received main signal. Accordingly, the ghost is no longer a 100% ghost. The multiplication results of the pre-processor 112 are transformed to the frequency domain by the Fast Fourier Transform 118, the multiplier 120 multiplies the frequency domain multiplication results from the Fast Fourier Transform 118 by the complex coefficients A in order to eliminate the ghost from the multiplication results of the pre-processor 112, and the inverse Fast Fourier Transform 122 transforms the ghost-free, frequency domain, modulated received main signal to the time domain. The post-processor 116 multiplies the output from the finite filter 114 by the coefficients c in order to reverse the effects of the modulation imposed by the pre-processor 102 and to apply a window function to the output of the inverse Fast Fourier Transform 122, as described above.

A controller 124 measures the interval d, supplies the coefficients b, A, and c to the pre-processor 112, the multiplier 120, and the post-processor 116, respectively, and synchronizes the pre-processor 112, the finite filter 114, and the post-processor 116 to each block of data moving through the equalizer 110.

Figure 9:
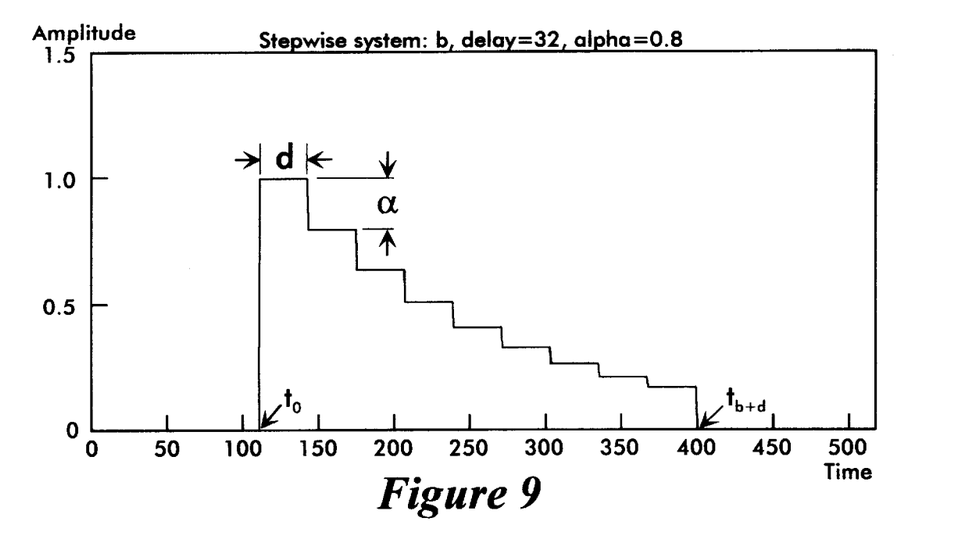
FIG. 9 illustrates a first embodiment of the response of the pre-processor of the equalizers shown in FIGS. 7 and 8.

The coefficients b applied by the pre-processors 102 and 112 may be discrete steps as shown by way of example in FIG. 9. Each of these steps has a width along the time axis equal to the interval d, which is the time interval separating the received main signal and its ghost. Also, the ratio of the amplitude of any one step to the amplitude of the next previous step is $\alpha$, where $\alpha$ is a constant and is preferably less than one. In the example shown in FIG. 9, $\alpha$ is 0.8. Moreover, the coefficients b are applied as a block to each Data In block and, therefore, the difference between to at the beginning of the block of coefficients b and $t_{b+d}$ at the end of the block of coefficients b is commensurate with the length in time of a Data In block plus d, where d, as discussed above, is the time interval separating the received main signal and its ghost. For example, if each Data In block has a duration of 256 samples times and d has a duration of 32 sample times, then the difference between $t_0$ and $t_b$ is 288 sample times, as shown in FIG. 9. In addition, there should be an appropriate guard interval on each side of the block of coefficients b.

Figure 16:
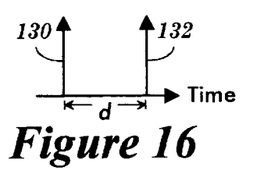
FIG. 16 is a time domain illustration of a received main signal and its ghost.
Figure 17:
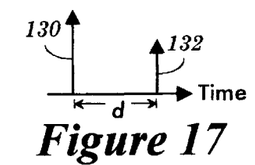
FIG. 17 illustrates the output of the pre-processor response in the time domain.

It is noted that the coefficients b modulate both the received main signal and its ghost, so that the amplitude of the ghost after application of the coefficients b is preferably less than the amplitude of the received main signal. Thus, if a received main signal 130 and its ghost 132 are shown in FIG. 16 as impulses separated by the interval d along the time axis, the signal 130 and its ghost 132 may have the appearance shown in FIG. 17 after application of the coefficients b. It is also noted that the coefficients b perform a window function in the sense that any energy received in the intervals outside of the Data In block plus the interval d is eliminated.

Figure 10:
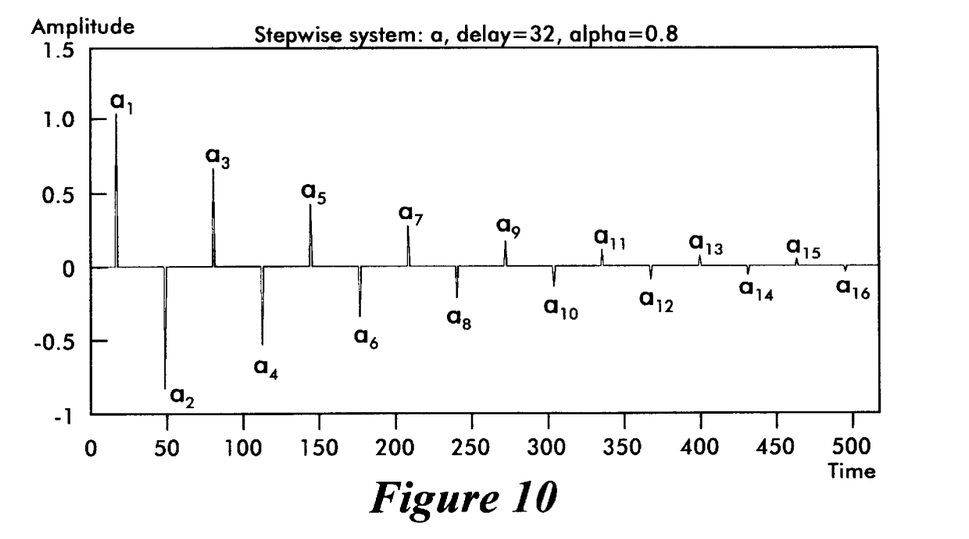
FIG. 10 illustrates the response of a convolver of the equalizer shown in FIG. 7.

The coefficients a applied by the finite filter 104 are shown in FIG. 10 by way of example. As can be S seen from FIG. 10, the coefficients a are applied as in the case of an FIR filter. Each adjacent pair of these coefficients are separated by the interval d. Also, the ratio of the magnitude of any one coefficient to the magnitude of the next previous coefficient is the constant $\alpha$. Because $\alpha$ is less than one, the magnitudes of the coefficients a asymptotically decrease toward zero. The coefficients a preferably occupy a space in time that is twice as long as a Data In block. For example, if a Data In block has a duration of 256 sample times, then the coefficients a preferably have a duration of 512 sample times. As a result of the application of the coefficients a by the finite filter 104, the ghost in the output from the pre-processor 102 is eliminated.

Figure 11:
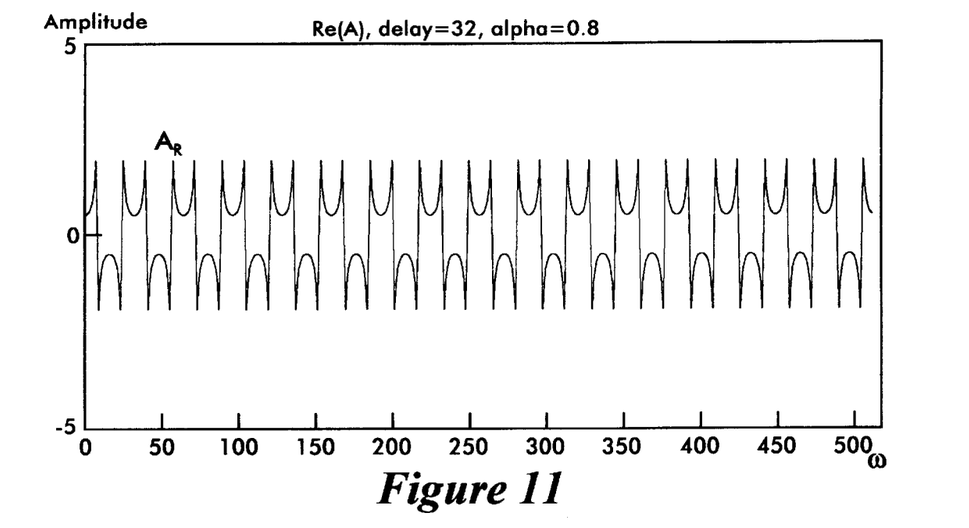
FIG. 11 illustrates the real part of the response of a multiplier of the equalizer shown in FIG. 8.
Figure 12:
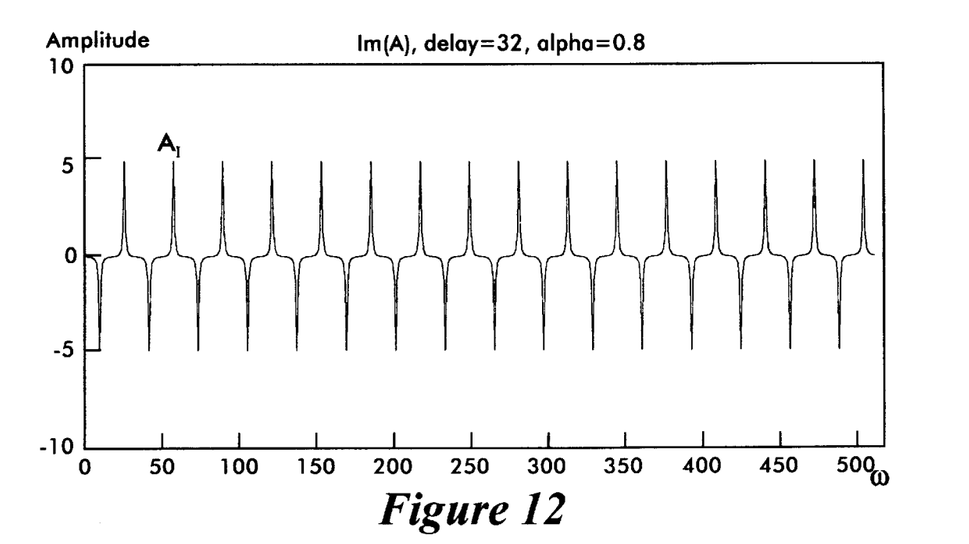
FIG. 12 illustrates the imaginary part of the response of a multiplier of the equalizer shown in FIG. 8.

The coefficients A applied by the multiplier 120 are shown in FIGS. 11 and 12 by way of example. Because the output of the Fast Fourier Transform 122 is complex, the coefficients A must also be complex. Accordingly, the coefficients A have a real part shown in FIG. 11 and an imaginary part shown in FIG. 12. As can be seen from FIGS. 11 and 12, the coefficients A are based upon the delay d and the ratio α. Again, the duration of each of the real and imaginary parts of the coefficients A is preferably twice as long as the duration of a Data In block. As a result of the application of the coefficients A by the multiplier 120, the ghost in the output from the pre-processor 112 is eliminated.

Figure 13:
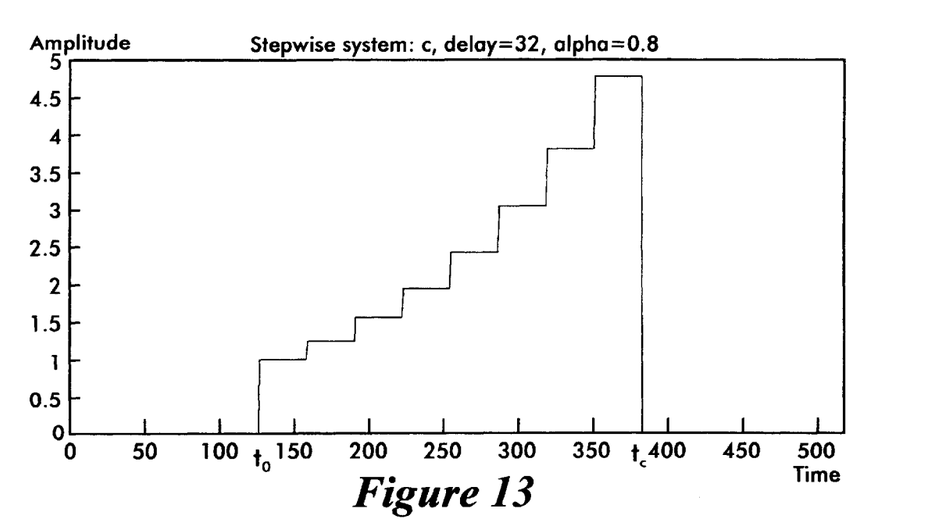
FIG. 13 illustrates a first embodiment of the response of a post-processor of the equalizers shown in FIGS. 7 and 8.

The coefficients c applied by the post-processors 106 and 116 may be discrete steps shown by way of example in FIG. 13. Each of these steps has the width d along the time axis. Also, α, which is the ratio of the amplitude of any one step to the amplitude of the next succeeding step in the case of the coefficients c, is preferably less than one. In the example shown in FIG. 13, α is 0.8. Moreover, the coefficients c are applied as a block to the output of the finite filter 104 and the output of the inverse Fast Fourier Transform 120 and, therefore, the difference between $t_0$ at the beginning of the block of coefficients c and $t_c$ at the end of the block of coefficients c is commensurate with the length in time of a Data In block. The difference between $t_0$ and $t_c$, is not required to include d which, as discussed above, is the length of time separating the received main signal and its ghost, because the ghost has already been eliminated. For example, if a Data In block has a duration of 256 samples times, then the difference between $t_0$ and $t_c$ is also 256 sample times. In addition, there should be an appropriate guard interval on each side of the block of coefficients c. The coefficients c reverse the modulation imposed on the received main signal by application of the coefficients b. The coefficients c also provide a window function so that a Data Out block at the output of the finite filters 104 and 114 has a duration which substantially matches the duration of a Data In block. Accordingly, the number of impulses in the response of the finite filters 104 and 114 need not be infinite in order to eliminate a 100% ghost, but may instead be a practicable number.

Figure 14:
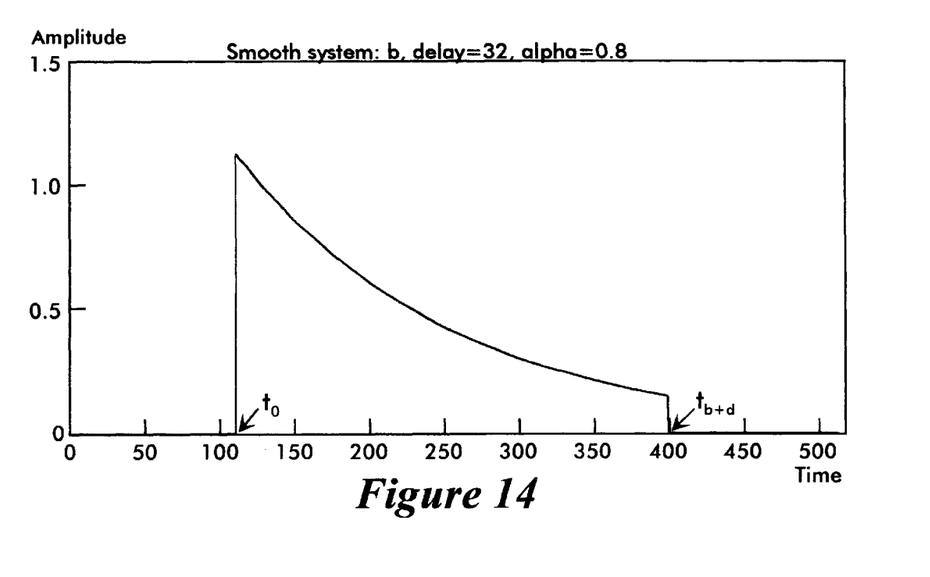
FIG. 14 illustrates a second embodiment of the response of the pre-processor of the equalizers shown in FIGS. 7 and 8.

The coefficients b and c as described above in relation to FIGS. 9 and 13 generally require a priori knowledge of d. The coefficients b and c described below in relation to FIGS. 14 and 15 require no a priori knowledge of d. The curve for the coefficients b as shown by way of example in FIG. 14 is such that the ratio of the amplitude of the curve at any point x1 along the time axis to the amplitude of the curve at a point x2 is the constant α, where x1 and x2 are separated by d, where d may have any value, and where x2 occurs earlier along the time axis than x1. The constant α is preferably less than one. In the example shown in FIG. 14, α is 0.8. Moreover, as before, the coefficients b are applied as a block to a Data In block and, therefore, the difference between $t_0$ at the beginning of the curve and $t_{b+d}$ at the end of the curve is commensurate with the length in time of a Data In block plus d where d, as discussed above, is the length of time separating the received main signal and its ghost. In addition, there should be an appropriate guard interval on each side of the block of coefficients b.

The curve for the coefficients b as shown in FIG. 14 is given by the following equation:

$$b = k_0 \alpha^{-\frac{x}{k_1}} \quad (1)$$

where x is a point along the time axis between $t_0$ and $t_{b+d}$, α is as described above, $k_0$ is a constant such that b has a desired value at the point $t_0$, and $k_1$, is related to d.

Figure 15:
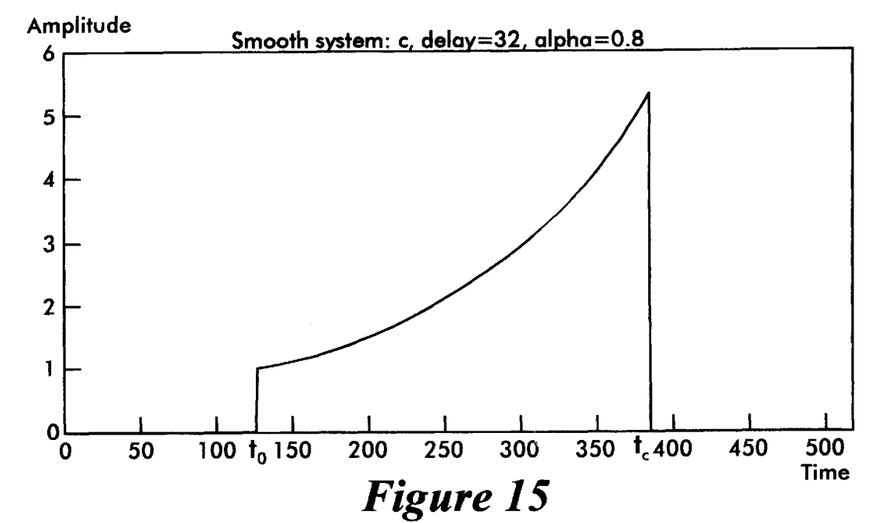
FIG. 15 illustrates a second embodiment of the response of a post-processor of the equalizers shown in FIGS. 7 and 8.

The curve for the coefficients c as shown by way of example in FIG. 15 is such that the ratio of the amplitude of the curve at any point x1 along the time axis to the amplitude of the curve at a point x2 is α, where x1 and x2 are separated by d, where d may be any value, and where x2 occurs later along the time axis than x1. As shown in FIG. 15, α is 0.8. As before, the coefficients c are applied as a block to the output of the finite filter 104 and the inverse Fast Fourier Transform 120 and, therefore, the difference between $t_0$ at the beginning of the block of coefficients c and $t_c$ at the end of the block of coefficients c is commensurate with the duration of a Data In block. The difference between $t_0$ and $t_c$ is not required to include d because the ghost has already been eliminated. In addition, there should be an appropriate guard interval on each side of the block of coefficients c. The coefficients c reverse the modulation imposed on the signal by application of the coefficients b. Also, as discussed above, the coefficients c provide a window function so that a Data Out block at the output of the finite filters 104 and 114 has a duration that substantially matches the duration of a corresponding Data In block.

The curve for the coefficients c as shown in FIG. 15 is given by the following equation:

$$c = k_0 \alpha^{\frac{x}{k_1}} \quad (2)$$

where x is a point along the time axis between $t_0$ and $t_c$, α is as described above, $k_0$ is a constant such that c has a desired value at the point $t_0$, and $k_1$ is related to d.

It is noted that the number of calculations performed by the transforms shown in FIG. 6 increases in accordance with $n^2$ as n increases, where n is the number of data elements in a data block. It is further noted that the number of calculations performed by a convolver, such as the convolver 108 of FIG. 7, also increases in accordance with $n^2$ as n increases. However, the number of calculations performed by the finite filter 114 of FIG. 8 increases in accordance with $n^2$ as n increases. Thus, the calculations performed by the equalizer 110 are considerably fewer than the calculations performed by the transforms of FIG. 6.

Figure 18:
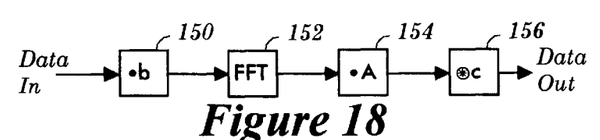
FIG. 18 illustrates a third embodiment of an equalizer in accordance with the present invention.

Two embodiments of an equalizer in accordance with the present invention have been discussed above in relation to FIGS. 7 and 8. However, other embodiments of an equalizer in accordance with the present invention are possible. For example, as shown in FIG. 18, a pre-processor 150 multiplies the received main signal and its ghost by the coefficients b. The output of the pre-processor 150 is transformed to the frequency domain by a Fast Fourier Transform 152, and a multiplier 154 multiplies the frequency domain output of the Fast Fourier Transform 152 by the complex coefficients A such as those shown in FIGS. 11 and 12. A convolver 156 convolves the output of the multiplier 154 with the coefficients C in order to recover the data that was transmitted through the channel. The coefficients C in this case must be complex. Also, an inverse Fast Fourier Transform, which is the complement of the Fast Fourier Transform 152, is located in the transmitter and transforms the signals therein to the time domain for transmission through the channel.

Figure 19:
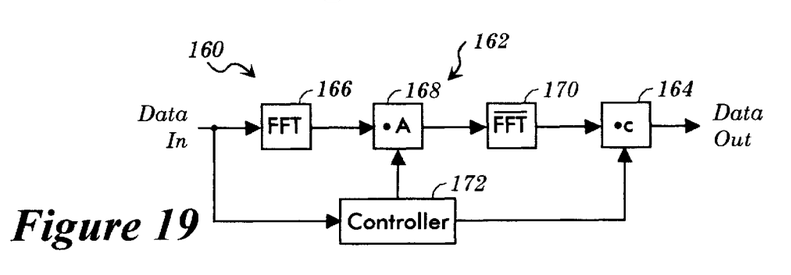
FIG. 19 illustrates a fourth embodiment of an equalizer in accordance with the present invention.

FIG. 19 illustrates an equalizer 160 which includes a finite filter 162 and a post-processor 164. The finite filter 162 includes a Fast Fourier Transform 166, a multiplier 168, and an inverse Fast Fourier Transform 170. The signal received from the channel is transformed to the frequency domain by the Fast Fourier Transform 166, the multiplier 168 multiplies the frequency domain signal from the Fast Fourier Transform 166 by complex coefficients A in order to eliminate the ghost from the received signal, and the inverse Fast Fourier Transform 170 transforms the ghostfree, frequency domain signal to the time domain. The post-processor 172 multiplies the output from the finite filter 162 by the coefficients c in order to apply a window function to the output of the inverse Fast Fourier Transform 170 so that each Data Out block at the output of the finite filter 162 has a duration that substantially matches the duration of its corresponding Data In block being processed by the equalizer 160.

A controller 172 measures the interval d in order to determine the coefficients A, supplies the coefficients A and c to the multiplier 168 and the post-processor 164, respectively, and synchronizes the finite filter 162 and the post-processor 164 to each block of data moving through the equalizer 160.

Figure 20:
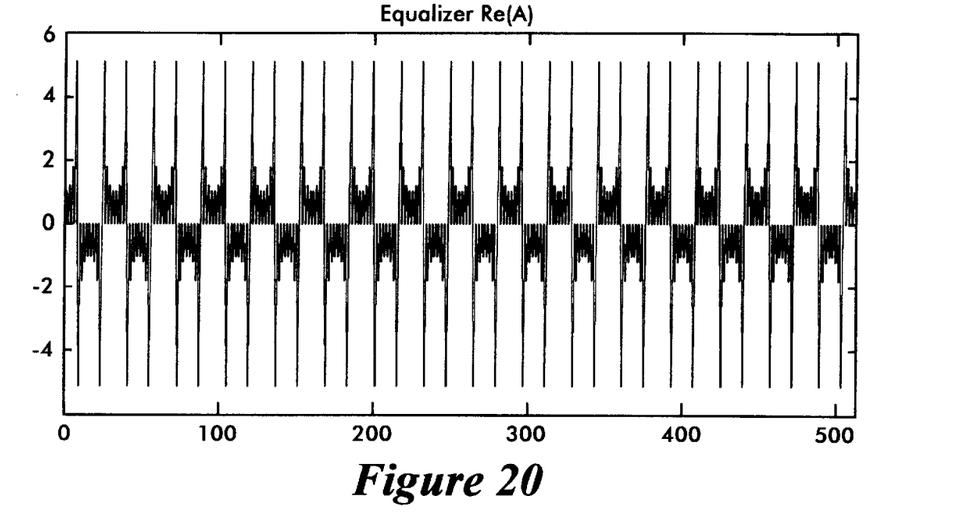
FIG. 20 illustrates the real part of the response of a multiplier of the equalizer shown in FIG. 19.
Figure 21:
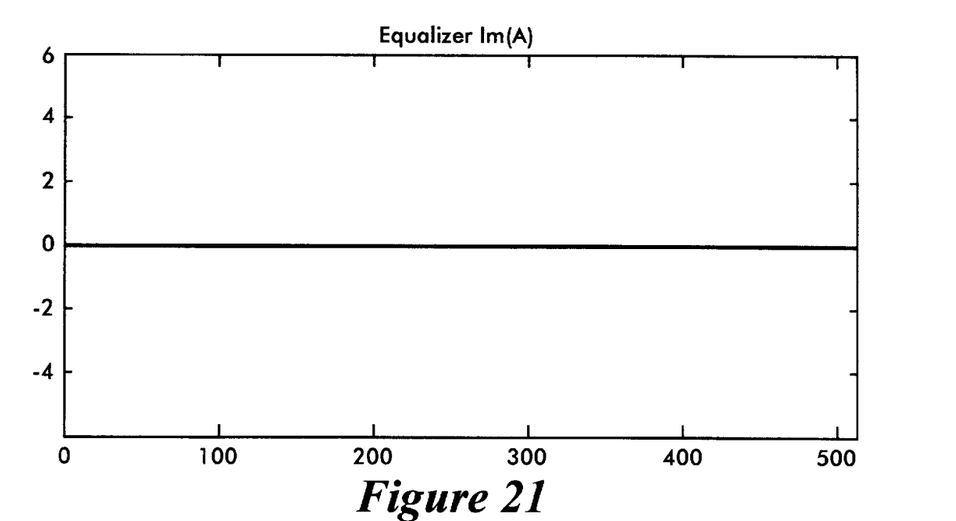
FIG. 21 illustrates the imaginary part of the response of a multiplier of the equalizer shown in FIG. 19; and, FIG. 22 illustrates a response of a post-processor of the equalizer shown in FIG. 19.

The coefficients A applied by the multiplier 168 are shown in FIGS. 20 and 21 by way of example. Because the output of the Fast Fourier Transform 166 is complex, the coefficients A must also be complex. Accordingly, the coefficients A have a real part shown in FIG. 20 and an imaginary part shown in FIG. 21. As can be seen from FIGS. 20 and 21, the coefficients A are based upon the interval d and the ratio α. Again, each of the real and imaginary parts of the coefficients A preferably have a duration that is twice as long as the duration of a Data In block. As a result of the application of the coefficients A by the multiplier 168, the ghost in the output from the pre-processor 102 is eliminated.

Figure 22:
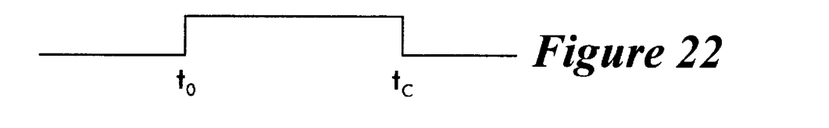

The coefficients c applied by the post-processor 164 are shown by way of example in FIG. 22. Because there is no pre-processor in the equalizer 160 that modulates both the received main signal and the ghost, the coefficients c are not required to undo the effects of any modulation. Therefore, the coefficients may have a constant non-zero value within the window from $t_0$ and $t_c$. The coefficients c shown in FIG. 22 are applied as a block to the output of the finite filter 162 and, therefore, the difference between $t_0$ at the beginning of the coefficients c and $t_c$ at the end of the coefficients c is commensurate with the duration of each Data In block. As before, if a Data In block has a duration of 256 samples times, then the difference between $t_0$ and $t_c$ is also 256 sample times. In addition, there should be an appropriate guard interval on each side of the block of coefficients c. The coefficients c provide a window function that limits each Data Out block at the output of the finite filter 162 to a duration that substantially matches the duration of its corresponding Data In block. Accordingly, the number of impulses in the response of the finite filter 162 need not be infinite in order to eliminate a 100% ghost, but may instead be a practicable number.

Certain modifications and alternatives of the present invention have been discussed above. Other modifications and alternatives will occur to those practicing in the art of the present invention. For example, because the present invention operates most satisfactorily in the presence of ghosts and other linear distortions, the term ghost as used herein in connection with the present invention includes ghosts and/or other linear distortions.

Moreover, the coefficients b have been shown above as non-complex coefficients. However, the coefficients b may be complex, such as where the received main signal is a QAM signal.

Accordingly, the description of the present invention is to be construed as illustrative only and is for the purpose of teaching those skilled in the art the best mode of carrying out the invention. The details may be varied substantially without departing from the spirit of the invention, and the exclusive use of all modifications which are within the scope of the appended claims is reserved.

What is claimed is:

1. An equalizer for processing blocks of data comprising:
 a pre-processor, wherein the pre-processor applies coefficients b to a received signal, wherein the coefficients b comprise a window function having a duration substantially equal to a duration of a block of data plus a temporal separation between a main signal and a ghost of the main signal, and wherein pre-processor is arranged to provide a pre-processed output;
 a finite filter having an output, wherein the finite filter is arranged to substantially eliminate the ghost from the pre-processed output in order to provide a substantially ghost free signal at the output of the finite filter; and,
 a post-processor arranged to apply a window function to the output of the finite filter, wherein the window function has a duration substantially equal to a duration of a block of data, and wherein the post-processor applies coefficients c.

2. The equalizer of claim 1 wherein the finite filter is a time domain finite filter.

3. The equalizer of claim 2 wherein the time domain finite filter comprises an FIR filter.

4. The equalizer of claim 1 wherein the finite filter is a frequency domain finite filter.

5. The equalizer of claim 4 wherein the frequency domain finite filter comprises a Fast Fourier Transform arranged to transform the pre-processed output to the frequency domain, a multiplier arranged to multiply the pre-processed output by coefficients to substantially eliminate the ghost from the pre-processed output, and an inverse Fast Fourier Transform arranged to transform the substantially ghost free signal back to the time domain.

6. An equalizer for processing blocks of data comprising:
 a pre-processor, wherein the pre-processor applies coefficients b to a received signal, and wherein pre-processor is arranged to provide a pre-processed output;
 a finite filter having an output, wherein the finite filter is arranged to substantially eliminate a ghost from the pre-processed output in order to provide a substantially ghost free signal at the output of the finite filter; and,
 a post-processor arranged to apply a window function to the output of the finite filter, wherein the window function has a duration substantially equal to a duration of a block of data, wherein the post-processor applies coefficients c, and wherein the coefficients b and c equal one.

7. The equalizer of claim 1 wherein the coefficients b comprise steps of different magnitudes, and wherein the coefficients c comprise steps of different magnitudes.

8. An equalizer for processing blocks of data comprising:
 a pre-processor, wherein the pre-processor applies coefficients b to a received signal, wherein the pre-processor is arranged to provide a pre-processed output;
 a finite filter having an output, wherein the finite filter is arranged to substantially eliminate a ghost from the pre-processed output in order to provide a substantially ghost free signal at the output of the finite filter; and, a post-processor arranged to apply a window function to the output of the finite filter, wherein the post-processor applies coefficients c, wherein the window function has a duration substantially equal to a duration of a block of data, wherein the coefficients b comprise steps of different magnitudes, wherein the coefficients c comprise steps of different magnitudes, wherein each of the steps has a length in time substantially equal to a temporal separation between a main signal of the received signal and the ghost, and wherein a ratio of the magnitude of one of the steps to the magnitude of an adjacent step is unequal to one.

9. An equalizer for processing blocks of data comprising:
a pre-processor, wherein the pre-processor applies coefficients b to a received signal, wherein the pre-processor is arranged to provide a pre-processed output;
a finite filter having an output, wherein the finite filter is arranged to substantially eliminate a ghost from the pre-processed output in order to provide a substantially ghost free signal at the output of the finite filter; and,
a post-processor arranged to apply a window function to the output of the finite filter, wherein the window function has a duration substantially equal to a duration of a block of data, wherein the post-processor applies coefficients c, wherein the coefficients b comprise steps of different magnitudes, wherein the coefficients c comprise steps of different magnitudes, wherein the steps of one of the coefficients b and c are of decreasing magnitude, and wherein the steps of the other of the coefficients b and c are of increasing magnitude.

10. An equalizer for processing blocks of data comprising:
a pre-processor, wherein the pre-processor applies coefficients b to a received signal, wherein pre-processor is arranged to provide a pre-processed output;
a finite filter having an output, wherein the finite filter is arranged to substantially eliminate a ghost from the pre-processed output in order to provide a substantially ghost free signal at the output of the finite filter; and,
a post-processor arranged to apply a window function to the output of the finite filter, wherein the window function has a duration substantially equal to a duration of a block of data, wherein the post-processor applies coefficients c, wherein the coefficients b comprise an exponential curve, and wherein the coefficients c comprise an exponential curve.

11. The equalizer of claim 10 wherein the exponential curve of one of the coefficients b and c is of decreasing magnitude, and wherein the exponential curve of the other of the coefficients b and c is of increasing magnitude.

12. The equalizer of claim 1 wherein the window function extends between $t_0$ and $t_e$, wherein the duration $t_e - t_0$ substantially matches a block of data, wherein the window function is substantially zero for $t < t_0$ and for $t > t_e$, and wherein the window function is non-zero where $t_0 < t < t_e$.

13. The equalizer of claim 1 wherein the finite filter applies coefficients a to the main signal and to the ghost.

14. The equalizer of claim 13 wherein the coefficients a are complex.

15. An equalizer for processing blocks of data comprising:
a pre-processor, wherein the pre-processor applies coefficients b to a received signal so as to make a main signal of the received signal and a ghost of the main signal unequal and so as to form an output;
a finite filter having an output, wherein the finite filter is arranged to substantially eliminate the ghost from the output of the pre-processor in order to provide a substantially ghost free signal at the output of the finite filter; and,
a post-processor arranged to apply a window function to the output of the finite filter, wherein the window function has a duration substantially equal to a duration of a block of data.

16. The equalizer of claim 15 wherein the coefficients b comprise steps of different magnitudes.

17. The equalizer of claim 16 wherein each of the steps has a duration substantially equal to a temporal separation between the main signal and the ghost, and wherein a ratio of the magnitude of one of the steps to the magnitude of an adjacent step is unequal to one.

18. The equalizer of claim 15 wherein the coefficients b comprise an exponential curve.

19. The equalizer of claim 15 wherein the coefficients b are complex.

20. The equalizer of claim 15 wherein the post-processor applies coefficients c to the filtered signal so as to remove the modulation introduced by the pre-processor.

21. The equalizer of claim 20 wherein the coefficients c comprise steps of different magnitudes.

22. The equalizer of claim 21 wherein each of the steps has a duration substantially equal to a temporal separation between the main signal and the ghost, and wherein a ratio of the magnitude of one of the steps to the magnitude of an adjacent step is unequal to one.

23. The equalizer of claim 20 wherein the coefficients c comprise an exponential curve.

24. The equalizer of claim 20 wherein the coefficients c are complex.

25. The equalizer of claim 20 wherein the finite filter applies coefficients a to the output of the pre-processor, and wherein the output of the pre-processor contains the received main signal and the ghost.

26. The equalizer of claim 25 wherein the coefficients a are complex.

27. The equalizer of claim 15 wherein the post-processor applies coefficients c, wherein the coefficients c have a duration substantially equal to a duration of a data block, and wherein the coefficients b have a duration substantially equal to the duration of a data block plus a temporal separation between the main signal and the ghost.

28. The equalizer of claim 27 wherein the finite filter applies coefficients a to the output of the pre-processor, and wherein the coefficients a have a duration which is greater than the duration of a data block.

29. An equalizer for processing blocks of data comprising:
a finite filter having an output, wherein the finite filter is arranged to substantially eliminate a ghost from a received signal in order to provide a substantially ghost free signal at the output; and,
a post-processor arranged to apply a window function to the output of the finite filter, wherein the window function has a duration substantially equal to a duration of a block of data, wherein the finite filter applies coefficients a to the received signal, wherein the post-processor applies coefficients c to the output of the finite filter, wherein the coefficients a have a duration which is greater than a duration of a data block, and wherein the coefficients c have a duration which substantially matches the duration of a data block.

30. The equalizer of claim 29 wherein the coefficients a have a duration which is substantially twice the duration of a data block.

31. An equalizer comprising:
a pre-processor, wherein the pre-processor applies coefficients b to a received main signal and a ghost of the received main signal in order to modulate the received main signal and the ghost;
a finite filter, wherein the finite filter applies coefficients a to the modulated received main signal and ghost in order to substantially eliminate the ghost; and,
a post-processor, wherein the post-processor applies coefficients c as a window function to the received main signal in an output of the finite filter in order to remove the modulation imposed on the received main signal by the coefficients b.

32. The equalizer of claim 31 wherein the finite filter is a time domain finite filter.

33. The equalizer of claim 32 wherein the time domain finite filter comprises an FIR filter.

34. The equalizer of claim 31 wherein the finite filter is a frequency domain finite filter.

35. The equalizer of claim 34 wherein the frequency domain finite filter comprises a Fast Fourier Transform arranged to transform the received main signal and the ghost to the frequency domain, a multiplier arranged to multiply the received main signal and the ghost by the coefficients A in order to substantially eliminate the ghost, and an inverse Fast Fourier Transform arranged to transform the received main signal back to the time domain.

36. The equalizer of claim 31 wherein the coefficients b comprise steps of different magnitudes, wherein each of the steps has a duration substantially equal to a temporal separation between the received main signal and the ghost, and wherein a ratio of the magnitude of one of the steps to the magnitude of an adjacent step is unequal to one.

37. The equalizer of claim 31 wherein the coefficients b comprise an exponential curve.

38. The equalizer of claim 31 wherein the coefficients c comprise steps of different magnitudes, wherein each of the steps has a duration substantially equal to a temporal separation between the received main signal and the ghost, and wherein a ratio of the magnitude of one of the steps to the magnitude of an adjacent step is unequal to one.

39. The equalizer of claim 31 wherein the coefficients c comprise an exponential curve.

40. The equalizer of claim 31 wherein the coefficients b and c comprise steps of different magnitudes, wherein each of the steps has a duration substantially equal to a temporal separation between the received main signal and the ghost, and wherein a ratio of the magnitude of one of the steps to the magnitude of an adjacent step is unequal to one.

41. The equalizer of claim 31 wherein the coefficients b and c comprise corresponding exponential curves.

42. The equalizer of claim 31 wherein the coefficients c have a duration substantially equal to a duration of a data block, and wherein the coefficients b have a duration substantially equal to the duration of a data block plus a temporal separation between the received main signal and the ghost, and wherein the coefficients a have a duration which is substantially twice the duration of a data block.

43. A method of equalizing a signal including a main signal and at least one ghost of the main signal comprising:
receiving the main signal and the ghost;
pre-processing the received main signal and ghost so that the pre-processed ghost has a smaller amplitude than the pre-processed main signal even if the received ghost is substantially a 100% ghost; and,
filtering the pre-processed main signal and ghost so as to substantially eliminate the pre-processed ghost.

44. The method of claim 43 wherein the filtering of the pre-processed main signal and ghost comprises filtering the pre-processed main signal and ghost with a time domain finite filter.

45. The method of claim 44 wherein the time domain finite filter comprises an FIR filter.

46. The method of claim 43 wherein the filtering of the pre-processed main signal and ghost comprises filtering the pre-processed main signal and ghost with a frequency domain finite filter.

47. The method of claim 46 wherein the frequency domain finite filter comprises a Fast Fourier Transform arranged to transform the pre-processed main signal and the pre-processed ghost to the frequency domain, a multiplier arranged to multiply the pre-processed main signal and the pre-processed ghost by the coefficients A in order to substantially eliminate the pre-processed ghost, and an inverse Fast Fourier Transform arranged to transform the output of the multiplier back to the time domain.

48. The method of claim 43 wherein the pre-processing of the received main signal and ghost comprises processing the received main signal and ghost in accordance with coefficients.

49. The method of claim 43 wherein the pre-processing of the received main signal and ghost comprises multiplying the received main signal and ghost by coefficients.

50. The method of claim 49 wherein the multiplying of the received main signal and ghost by coefficients comprises multiplying the received main signal and ghost by coefficients b, wherein the coefficients b comprise steps having different magnitudes, wherein each of the steps has a duration substantially equal to a temporal separation between the received main signal and the ghost, and wherein a ratio of the magnitude of one of the steps to the magnitude of an adjacent step is unequal to one.

51. The method of claim 49 wherein the multiplying of the received main signal and ghost by coefficients comprises multiplying the received main signal and ghost by coefficients b, and wherein the coefficients b comprise an exponential curve.

52. The method of claim 43 further comprising post-processing the substantially ghost free pre-processed main signal so as to reverse effects on the main signal by the pre-processing.

53. The method of claim 43 further comprising applying a window function to the substantially ghost free pre-processed main signal.

54. The method of claim 43 wherein the filtering of the pre-processed main signal and ghost comprises filtering the pre-processed main signal and ghost with an FIR filter.

55. A method of equalizing a channel comprising:
receiving a signal having a main signal component and a ghost component;
pre-processing the received signal so that the pre-processed main signal component and the pre-processed ghost component have unequal magnitudes; and,
substantially removing the pre-processed ghost component from the pre-processed signal so as to output the pre-processed main signal component substantially without the pre-processed ghost component.

56. The method of claim 55 wherein the substantially removing of the pre-processed ghost component from the pre-processed signal comprises filtering the pre-processed signal with a time domain finite filter.

57. The method of claim 56 wherein the time domain finite filter comprises an FIR filter.

58. The method of claim 55 wherein the substantially removing of the pre-processed ghost component from the pre-processed signal comprises filtering the pre-processed signal with a frequency domain finite filter.

59. The method of claim 58 wherein the frequency domain finite filter comprises a Fast Fourier Transform arranged to transform the pre-processed main signal component and the pre-processed ghost component to the frequency domain, a multiplier arranged to multiply the pre-processed main signal component and the pre-processed ghost component by the coefficients A in order to substantially eliminate the pre-processed ghost component, and an inverse Fast Fourier Transform arranged to transform the output of the multiplier back to the time domain.

60. The method of claim 55 wherein the pre-processing of the received signal comprises pre-processing the main signal component and the ghost component in accordance with coefficients.

61. The method of claim 55 wherein the pre-processing of the received signal comprises multiplying the main signal component and the ghost component by coefficients.

62. The method of claim 61 wherein the multiplying of the main signal component and the ghost component by coefficients comprises multiplying the main signal component and the ghost component by coefficients b, wherein the coefficients b comprise steps having different magnitudes, wherein each of the steps has a duration substantially equal to a temporal separation between the received main signal and the ghost, and wherein a ratio of the magnitude of one of the steps to the magnitude of an adjacent step is unequal to one.

63. The method of claim 61 wherein the multiplying of the main signal component and the ghost component by coefficients comprises multiplying the main signal component and the ghost component by coefficients b, and wherein the coefficients b comprise an exponential curve.

64. The method of claim 55 further comprising reversing effects on the pre-processed main signal component by the pre-processing.

65. The method of claim 55 further comprising applying a window function to the pre-processed main signal component substantially without the pre-processed ghost component.

66. The method of claim 55 wherein the substantially removing of the pre-processed ghost component from the pre-processed signal comprises filtering the pre-processed signal with an FIR filter.

* * * * *